US010751958B2

United States Patent
Kray et al.

(10) Patent No.: US 10,751,958 B2
(45) Date of Patent: Aug. 25, 2020

(54) COMPOSITE WOVEN OUTLET GUIDE VANE WITH OPTIONAL HOLLOW AIRFOIL

(71) Applicant: General Electric Company, Schenectady, NY (US)

(72) Inventors: Nicholas Joseph Kray, Mason, OH (US); Mark Ernest Vermilyea, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 909 days.

(21) Appl. No.: 14/891,079

(22) PCT Filed: May 8, 2014

(86) PCT No.: PCT/US2014/037267
§ 371 (c)(1),
(2) Date: Nov. 13, 2015

(87) PCT Pub. No.: WO2015/017001
PCT Pub. Date: Feb. 5, 2015

(65) Prior Publication Data
US 2016/0082674 A1  Mar. 24, 2016

Related U.S. Application Data

(60) Provisional application No. 61/823,128, filed on May 14, 2013.

(51) Int. Cl.
*B29C 70/48* (2006.01)
*B29C 33/52* (2006.01)
(Continued)

(52) U.S. Cl.
CPC .............. *B29C 70/48* (2013.01); *B29C 33/52* (2013.01); *B29C 70/222* (2013.01); *B29C 70/24* (2013.01);
(Continued)

(58) Field of Classification Search
CPC ....... B29C 70/48; B29C 33/52; B29C 70/222; B29C 70/24; D03D 11/02; D03D 25/005;
(Continued)

(56) References Cited

U.S. PATENT DOCUMENTS 3,619,448 A  11/1971  Palfreyman et al.
3,902,944 A   9/1975  Ashton et al.
(Continued)

FOREIGN PATENT DOCUMENTS

CN   102232020 A   11/2011
EP     2412931 A2    2/2012
(Continued)

OTHER PUBLICATIONS

Unofficial English translation of Office Action issued in connection with corresponding CN Application No. 201480027794.9 dated Aug. 15, 2016.
(Continued)

*Primary Examiner* — Christopher Verdier
(74) *Attorney, Agent, or Firm* — Dority & Manning, P.A.

(57) ABSTRACT

A composite woven outlet guide vane (32) and method of forming are depicted. The guide vane (32) is formed by use of a preform structure (100) with a core (150) which is removed following the manufacture.

18 Claims, 10 Drawing Sheets

(51) Int. Cl.
| | |
|---|---|
| *B29C 70/24* | (2006.01) |
| *F01D 9/04* | (2006.01) |
| *F01D 5/28* | (2006.01) |
| *D03D 25/00* | (2006.01) |
| *F01D 25/16* | (2006.01) |
| *B29D 99/00* | (2010.01) |
| *D03D 11/02* | (2006.01) |
| *B29C 70/22* | (2006.01) |
| *F01D 25/24* | (2006.01) |
| *B29L 31/08* | (2006.01) |
| *B29K 105/08* | (2006.01) |
| *B29K 307/04* | (2006.01) |

(52) U.S. Cl.
CPC ......... *B29D 99/0028* (2013.01); *D03D 11/02* (2013.01); *D03D 25/00* (2013.01); *D03D 25/005* (2013.01); *F01D 5/282* (2013.01); *F01D 9/042* (2013.01); *F01D 25/162* (2013.01); *F01D 25/246* (2013.01); *B29K 2105/089* (2013.01); *B29K 2307/04* (2013.01); *B29L 2031/08* (2013.01); *D10B 2505/02* (2013.01); *F05D 2300/603* (2013.01); *F05D 2300/6012* (2013.01); *Y02T 50/672* (2013.01)

(58) Field of Classification Search
CPC . D03D 25/00; B29D 99/0028; B29L 2031/08; B29L 2031/082; B29L 2031/085; B29L 2031/087; F01D 25/005; F01D 25/246; F01D 5/282; F01D 9/042; F01D 9/044; F01D 25/162; F05D 2300/603; F05D 2300/6034; F05D 2300/6012; Y02T 50/672
USPC .... 415/209.2, 209.3, 209.4, 210.1, 189, 190
See application file for complete search history.

(56) References Cited

U.S. PATENT DOCUMENTS

| | | | | |
|---|---|---|---|---|
| 4,248,817 | A | 2/1981 | Frank | |
| 4,993,918 | A * | 2/1991 | Myers | F01D 9/065 415/191 |
| 6,264,429 | B1 * | 7/2001 | Koeller | F01D 5/141 416/223 A |
| 7,326,030 | B2 * | 2/2008 | Albrecht | F01D 5/147 415/115 |
| 8,491,740 | B2 | 7/2013 | Serey et al. | |
| 9,080,454 | B2 | 7/2015 | Coupe et al. | |
| 2007/0154307 | A1 * | 7/2007 | Cairo | F01D 9/042 415/209.3 |
| 2009/0317246 | A1 * | 12/2009 | Lutz | F01D 5/14 415/200 |
| 2010/0209235 | A1 * | 8/2010 | Shim | B23P 15/04 415/200 |
| 2013/0011271 | A1 * | 1/2013 | Shi | F01D 5/28 416/230 |
| 2013/0101406 | A1 | 4/2013 | Kweder et al. | |

FOREIGN PATENT DOCUMENTS

| | | |
|---|---|---|
| FR | 2940167 A1 | 6/2010 |
| GB | 2146572 A | 4/1985 |
| JP | 2003-148105 A | 5/2003 |
| JP | 2007-182881 A | 7/2007 |
| WO | 2010004216 A1 | 1/2010 |

OTHER PUBLICATIONS

Notification of Reasons for Refusal issued in connection with corresponding JP Application No. 2016-513989 dated Jul. 4, 2017.
Unofficial English Translation of Chinese Office Action issued in connection with corresponding CN Application No. 201480027794.9 dated Jan. 18, 2017.
PCT Search Report and Written Opinion issued in connection with corresponding Application No. PCT/US2014/037267 dated Jan. 28, 2015.

* cited by examiner

COMPOSITE WOVEN OUTLET GUIDE VANE WITH OPTIONAL HOLLOW AIRFOIL

CROSS-REFERENCE TO RELATED APPLICATIONS

This application is a national stage application under 35 U.S.C. § 371(c) of prior filed, PCT application serial number PCT/US2014/037267, filed on May 8, 2014, which claims priority to U.S. Patent Application Ser. No. 61/823,128, titled "Composite Woven Outlet Guide Vane with Optional Hollow Airfoil" filed May 14, 2013. The above-listed applications are herein incorporated by reference.

BACKGROUND

The disclosed embodiments generally pertain to gas turbine engines. More particularly present embodiments relate to the structure of composite woven fan outlet guide vanes and optionally including a hollow airfoil.

In a gas turbine engine, air is pressurized in a compressor and mixed with fuel in a combustor for generating hot combustion gases which flow downstream through turbine stages. A typical gas turbine engine generally possesses a forward end and an aft end with its several core or propulsion components positioned axially therebetween. An air inlet or intake is located at a forward end of the engine. Moving toward the aft end, in order, the intake is followed by a fan, a compressor, a combustion chamber, and a turbine. It will be readily apparent from those skilled in the art that additional components may also be included in the engine, such as, for example, low-pressure and high-pressure compressors, and low-pressure and high-pressure turbines. This, however, is not an exhaustive list.

The compressor and turbine generally include rows of airfoils that are stacked axially in stages. Each stage includes a row of circumferentially spaced stator and a rotor assembly which rotates about a center shaft or axis of the turbine engine. A multi-stage low pressure turbine follows the multi-stage high pressure turbine and is typically joined by a second shaft to a fan disposed upstream from the compressor in a typical turbo fan aircraft engine configuration for powering an aircraft in flight. These turbine stages extract energy from the combustion gases.

The stator is formed by a plurality of nozzle segments which are abutted at circumferential ends to form a complete ring about the axis of the gas turbine engine. Each nozzle segment may comprise one or more vanes which extend between an inner band and an outer band. The stator nozzles direct the hot combustion gas in a manner to maximize extraction at the adjacent downstream turbine blades.

Turbine rotor assemblies typically include at least one row of circumferentially-spaced rotor blades. Each rotor blade includes an airfoil that having a pressure side and a suction side connected together at leading and trailing edges. Each airfoil extends radially outward from a rotor blade platform. Each rotor blade may also include a dovetail that extends radially inward from a shank extending between the platform and the dovetail. The dovetail is used to mount the rotor blade within the rotor assembly to a rotor disc or spool. Known blades are hollow such that an internal cooling cavity is defined at least partially by the airfoil, platform, shank, and dovetail.

In operation, air is pressurized in a compressor and mixed with fuel in a combustor for generating hot combustion gases which flow downstream through the multiple turbine stages. Typical gas turbine engines utilize a high pressure turbine and low pressure turbine to maximize extraction of energy from high temperature combustion gas. In the high pressure turbine, combustion gas engages the stator nozzle assembly, which directs the combustion gases downstream through the row of high pressure turbine rotor blades extending radially outwardly from a supporting rotor disc. A high pressure turbine first receives the hot combustion gases from the combustor. The high pressure turbine includes a first stage nozzle and a rotor assembly having a disk and a plurality of turbine blades. An internal shaft passes through the turbine and is axially disposed along a center longitudinal axis of the engine. Blades are circumferentially distributed on a rotor and extend radially causing rotation of the internal shaft. The internal shaft is connected to the rotor and the air compressor, such that the turbine provides a rotational input to the air compressor to drive the compressor blades. This powers the compressor during operation and subsequently drives the turbine. As the combustion gas flows downstream through the turbine stages, energy is extracted therefrom and the pressure of the combustion gas is reduced.

In the area of the fan and by-pass duct of the gas turbine engine, a fan frame assembly is disposed having a plurality of guide vanes. These vanes are typically formed of metal and are used to turn air exiting the fan within the by-pass duct. However, as with most concerns involving gas turbine engines, including aviation uses, it is desirable to reduce the weight of the engine as one manner in improving fuel efficiency and engine performance.

The information included in this Background section of the specification, including any references cited herein and any description or discussion thereof, is included for technical reference purposes only and is not to be regarded subject matter by which the scope of the invention is to be bound.

SUMMARY OF THE INVENTION

A method of forming a composite woven outlet guide vane, comprises forming a woven preform shape, weaving a first portion of the preform shape with a two and one-half dimensional weave, weaving a second portion of the preform shape with a three dimensional weave, forming at least one flange at one end of the preform shape, inserting a removable core into the woven preform in the area of the two and one-half dimensional weave, forming a desired airfoil shape with the preform shape and the core, attaching at least one cover plate at the at least one flange, placing the woven preform in a mold, and injecting resin into the mold to form a molded outer guide vane.

An outlet guide vane, comprises a composite outlet guide vane having an outer flange and an inner flange, a leading edge, a trailing edge, a suction side and a pressure side, the outer flange and the inner flange formed integrally with the outlet guide vane, a quick engine change structure disposed on the composite outlet guide vane, an inner cover plate disposed on the inner flange and an outer cover plate disposed on the outer flange, the composite outlet guide vane being hollow between the outer flange and the inner flange.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

The above-mentioned and other features and advantages of these exemplary embodiments, and the manner of attaining them, will become more apparent and the composite woven outlet guide vane will be better understood by reference to the following description of embodiments taken in conjunction with the accompanying drawings, wherein.

DETAILED DESCRIPTION

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring to FIGS. 1-12, various embodiments of a gas turbine engine 10 are depicted having composite outlet guide vanes formed in a process utilizing fiber matrix preforms and manipulating the preform until the desired shape is achieved and subsequently resin transfer molding and curing to form the airfoil shape. These structures may, but are not required to, be utilized with a quick engine change assembly which allows rapid connection or removal of propulsor components.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions. All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Figure 1:
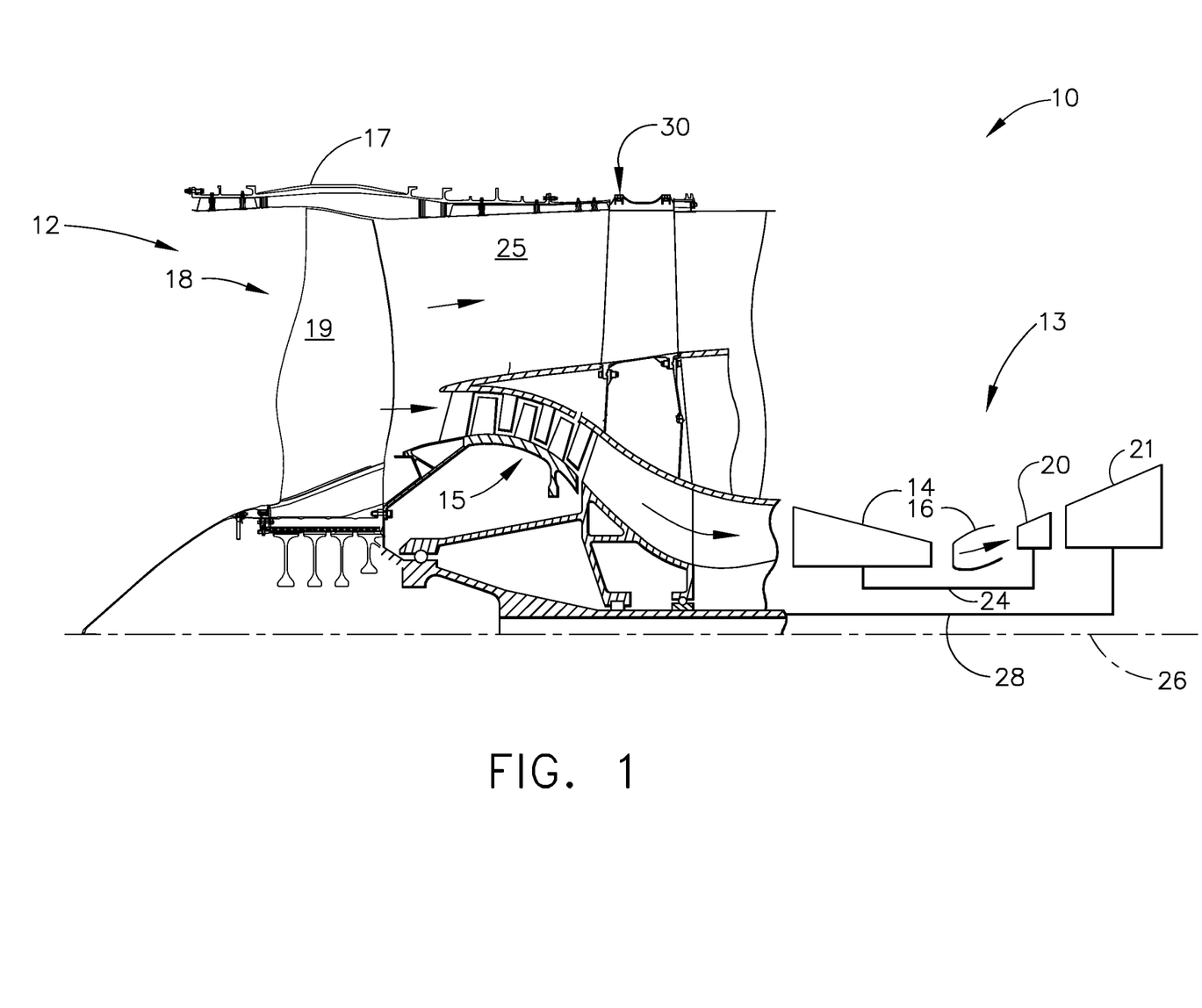
FIG. 1 is a side section view of an exemplary turbine engine.

Referring initially to FIG. 1, a schematic side section view of a gas turbine engine 10 is shown having an engine inlet end 12 wherein air enters a propulsor 13, which is defined generally by a multi-stage compressor, including for example a low pressure compressor 15 and a high pressure compressor 14, a combustor 16 and a multi-stage turbine, including for example a high pressure turbine 20 and a low pressure turbine 21. Collectively, the propulsor 13 provides power during operation. The gas turbine 10 may be used for aviation, power generation, industrial, marine service or the like. Depending on the usage, the engine inlet end 12 may contain a fan 18 including an array of exemplary blades 19 extending radially outward from the root. The gas turbine 10 is axis-symmetrical about engine axis 26 so that various engine components rotate thereabout. In operation air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of one or more high pressure compressor stages 14.

The engine 10 includes two shafts 24, 28. The axis-symmetrical shaft 24 extends through the turbine engine 10, from the forward end to an aft end. The shaft 24 is supported by bearings along its length. The shaft 24 may be hollow to allow rotation of the second shaft 28, a low pressure turbine shaft 28 therein. The shaft 28 extends between the low pressure turbine 21 and a low pressure compressor 15. Both shafts 24, 28 may rotate about the centerline axis 26 of the engine. During operation the shafts 24, 28 rotate along with other structures connected to the shafts such as the rotor assemblies of the turbine 20, 21, compressor 14, 15 and fan 18 in order to create power or thrust depending on the area of use, for example power, industrial or aviation.

Referring still to FIG. 1, the inlet 12 includes a turbofan 18 which has a plurality of blades 19. The turbofan 18 is operably connected by the shaft 28 to the low pressure turbine 21 and creates thrust for the turbine engine 10. Some of the air passes through a by-pass duct 25 and some of the air leaves the fan 18 and enters the low pressure compressor 15. The low pressure air from compressor 15 may be used to aid in cooling components of the engine as well.

Aft of the fan 18 and blade 19 is a fan frame assembly 30. The fan frame assembly 30 is formed of a fan hub frame 34 (FIG. 2), a fan case 36 (FIG. 2) and a plurality of airfoil shaped vanes 32 extending radially between and which extend circumferentially about the centerline 26 of the engine to generally surround the propulsor 13. The fan frame assembly 36 supports the case 17 and locates the case 17 relative to the engine centerline 26. The outlet guide vanes 32 turn the air flow in a desired manner as the airflow leaves the area of the fan 18.

An engine case 17 is depicted surrounding the fan 18 and a fan frame assembly 30. Between the fan case 17 and the propulsor 13, a by-pass duct 25 is defined. The by-pass duct 25 allows passage of air from the fan 18 and provides thrust from the engine 10.

Figure 2:
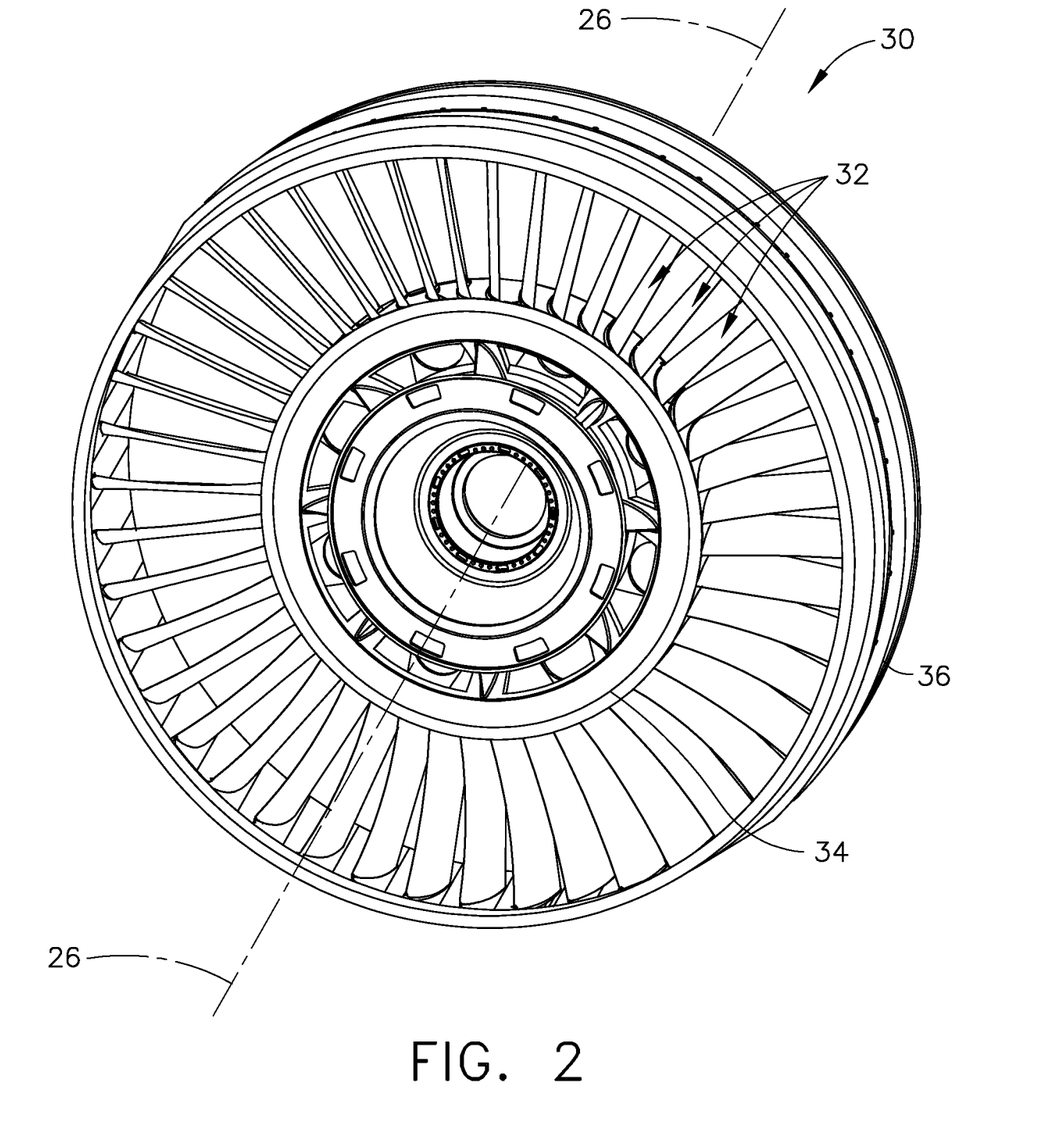
FIG. 2 is an isometric view of a fan outlet guide vane assembly.

Referring to FIG. 2, an isometric view of the fan frame assembly 30 is shown removed from the engine 10. The fan frame assembly 30 is generally provided with a first inner circular frame member or fan hub frame 34, a second outer circular frame member or fan case 36, and a plurality outlet guide vanes 32 disposed in a radial array between the hub frame 34 and fan case 36. The fan hub frame 34 maintains orientation of various components within the gas turbine engine. More specifically, the fan hub frame 34 interconnects stationary components that may provide rotor bearing support. The fan hub frame 34 may also be known by other names such as an intermediate compressor case. The outlet guide vanes 32 are positioned within a by-pass duct 25 of the engine. More specifically the vanes 32 are circumferentially spaced about the by-pass duct 25 to straighten air leaving the fan 18 in a desired manner.

The assembly 30 may also include one or more struts coupled between the fan case 36 and fan hub frame 34. The assembly 30 has a central longitudinal axis 26 that corresponds with the engine axis 26. The outlet guide vanes 32 and/or struts may provide a load path from the fan hub frame 34 (and thereby the propulsor 13) to engine mounts (not shown). The fan case 36 and fan hub frame 34 may be cast or forged. Alternatively, the case and hub frame 36, 34 may be formed of composite materials. The guide vanes 32 may be coupled to the case and hub frame 36, 34 by fasteners or alternatively may be coupled by welding or brazing, for example. In still a further alternative, the entire fan frame assembly may be entirely formed of composite material and either coupled or formed as a unitary structure or in a plurality of segments for subsequent coupling in a variety of manners.

According to some embodiments, the assembly 30 may be assembled in arcuate segments wherein the frame 34 and case 36 are coupled to the vanes 32 and struts. The struts may be located within the array of vanes 32, upstream of such or downstream of the vanes 32. As will be described further, each of the guide vanes 32 is mounted to support axial, radial and lateral loads.

Figure 3:
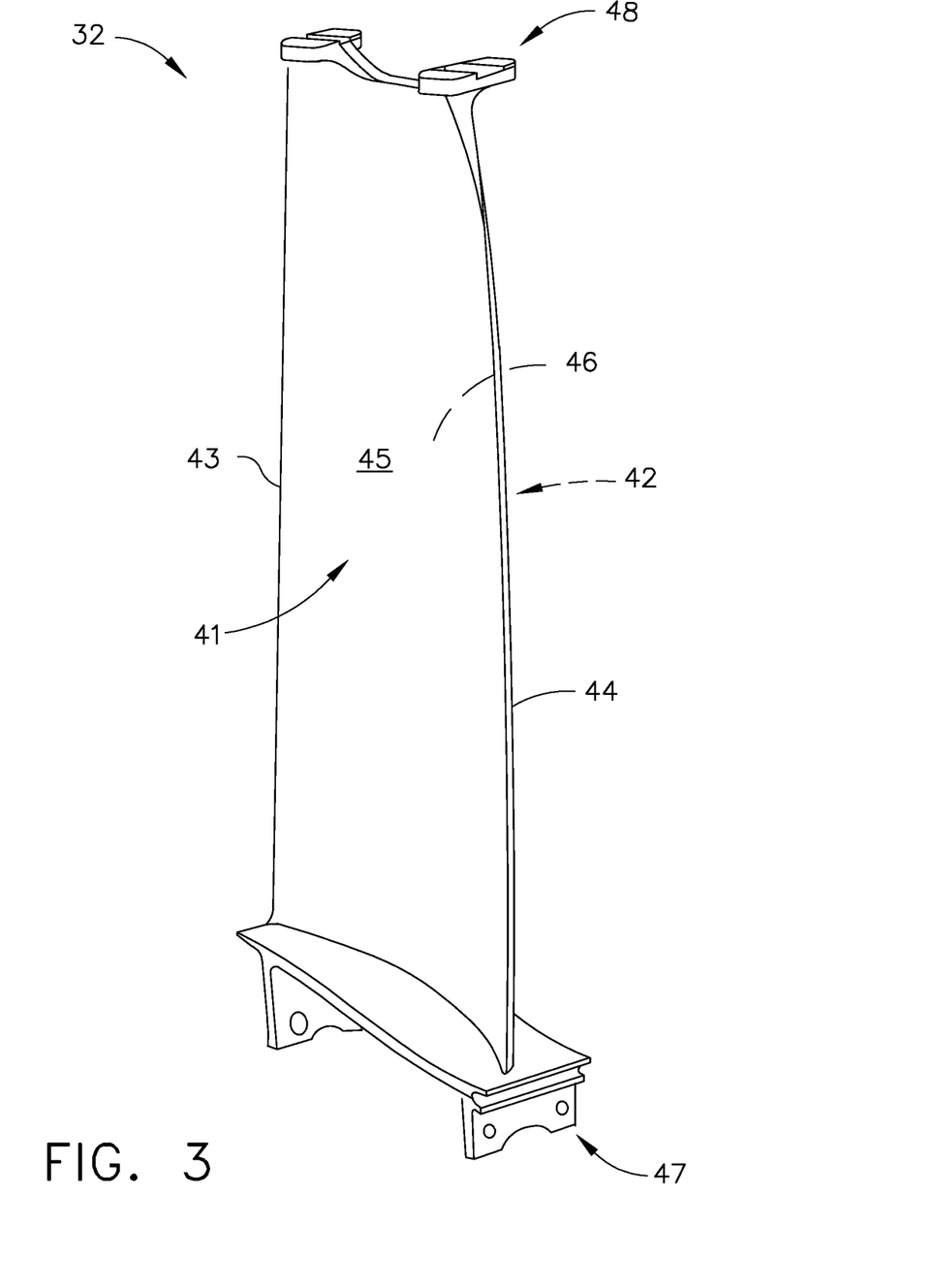
FIG. 3 is an isometric view of an airfoil.

Referring now to FIG. 3, an isometric view of an exemplary composite woven outlet guide vane or airfoil 32 is depicted removed from the fan frame assembly 30. The exemplary guide vane 32 is formed of a composite including matrix and reinforcement. The outlet guide vane 32 comprises a pressure side 41 and a suction side 42. These sides 41, 42 extend between a leading edge 43 and a trailing edge 44 in the chordwise direction, a direction defined along a straight axial line between the leading edge 43 and trailing edge 44. The curvature of the pressure and suction sides 41, 42 may be dependent on the desired turning of the air flow from the fan 18 and within the by-pass duct 25. The suction side 42 of the airfoil 32 may be convex while the pressure side 41 may be concave. The sides 41, 42 are defined by sidewalls 45, 46 and define a hollow interior for the composite guide vane 32. The vanes 32 may be shorter at the outer diameter than the inner diameter in the chordwise direction. Alternatively, the dimensions may be reversed. At a radial inner end, an axial bolt interface 47 is found for connection to the fan hub frame 34 wherein the bolt is oriented in a generally axial direction. At the radial outer end, a radial bolt interface 48 is found provide a connection interface at the fan case 36 wherein the bolt is oriented in a generally radial direction. However, this may be reversed and further the orientation of the bolt interfaces may vary and should not be considered limiting.

The vanes 32 include feet which connect the vane 32 to the inner ring 34 and outer ring 36 (FIG. 2). According to the exemplary embodiment, there are four feet at the radially inner end of the vane 32, two feet axially forward and two feet axially rearward. The radially inner feet define the axial bolt interface 47 and may be connected to, for example, the fan hub frame 34, or may be connected to a quick engine change assembly. At the outer end of the vanes 32 there are also four feet defining the radial bolt interface 48 which connect the vane to the radially outer structure, for example the fan case 36.

Figure 4:
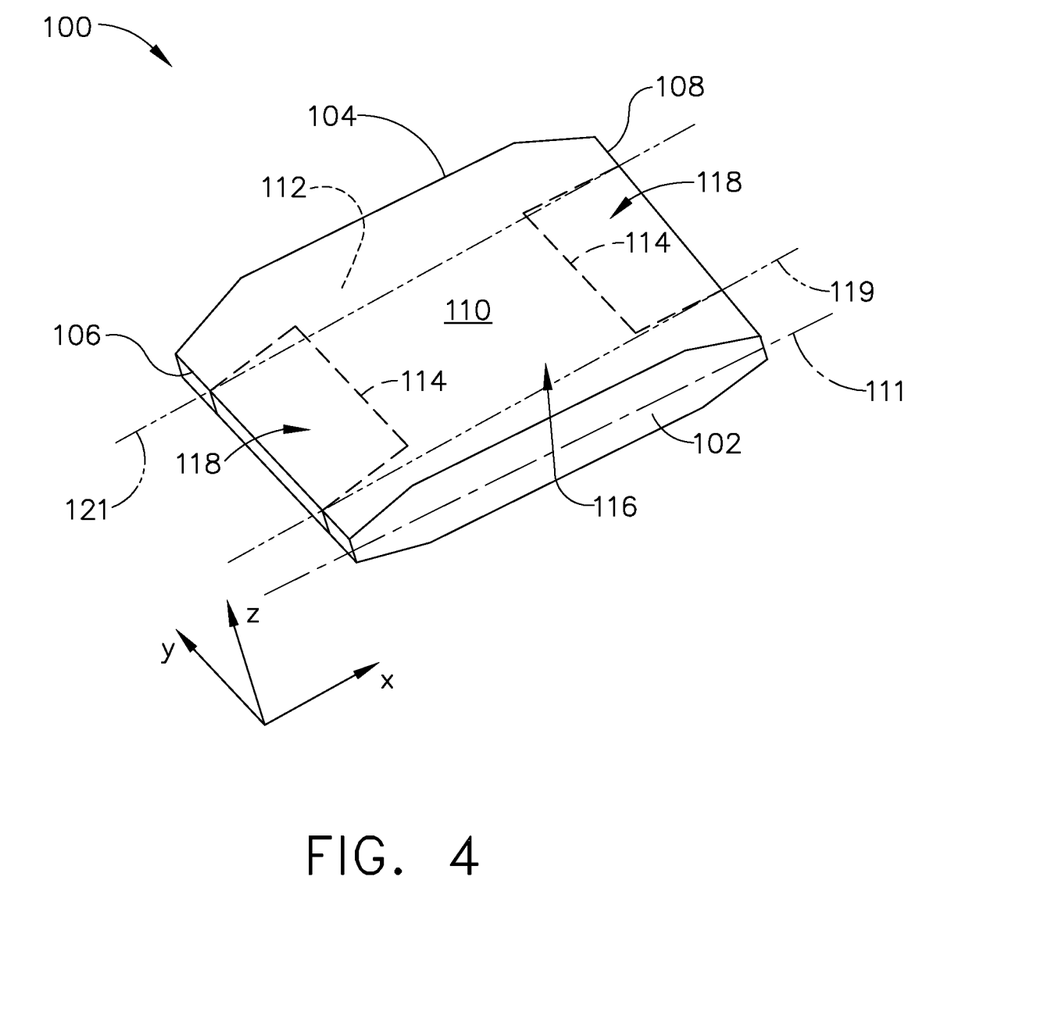
FIG. 4 is an isometric view of a preform structure for use in a first step of making a airfoil.

Referring now to FIG. 4, a preform structure 100 is shown in isometric view for forming the composite guide vane 32. The preform is formed of fibrous material, usually dry with some added tacktifier to aid handleability. For example, one such material may be a fiber composite, such as a carbon fiber composite woven preform. The preform 100 may be manufactured in a way that the fibers are continuously and uninterruptedly woven. The method to manufacture such a structure may be accomplished by, for example, resin transfer molding with dry fiber, automated fiber placement, or a hand layup process with pre-impregnated fiber. The composite preform 100 may also include metal, such as, for example, aluminum alloys, titanium alloys, and other known alloys suitable for use in a gas turbine engine, which will be used to provide attachments.

The preform 100 has a first edge 102, a second edge 104, a third edge 106 and a fourth edge 108. The edges define a boundary for a first upper side 110 and a second lower side 112. The upper side 110 is separated in the thickness dimension Z from the lower side 112 along axis 111 at area 116 but not areas 118. The preform 100 may be flat, contoured or may be tapered along one or more surfaces and at one or more locations.

The preform 100 comprises seam lines 114 defining change from areas of two and one-half dimensional weave 116 and three dimensional weave 118. In the areas 118, bounded by edges 106 or 108 and the seam 114, the weave 118 extends through a thickness dimension Z of the preform 100. This inhibits separation of the upper side 110 from the lower side 112 along and within this area bounded by the seam 114. However, portions not within this area bounded by seam 114 may be separated by puckering or otherwise forcing apart the upper side 110 from the lower side 112.

With the halves of the preform 100 being separable, the upper side 110 is folded upward about fold line 119 and upward about fold line 121. Similarly, the lower side 112 is folded downward about fold line 119 and about fold line 121. The result folded preform is shown in FIG. 5.

Figure 5:
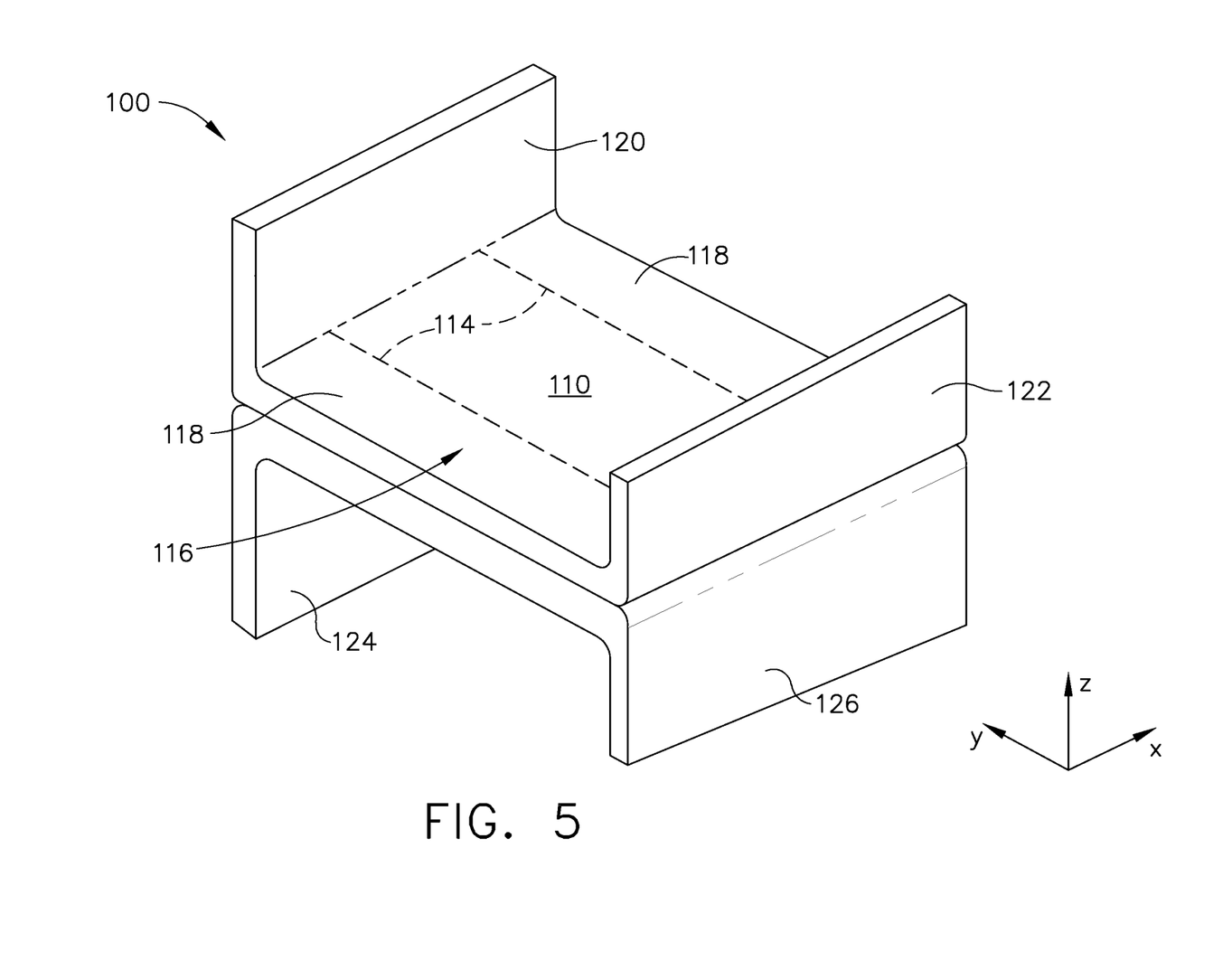
FIG. 5 is an isometric view of a manipulated preform for use in a second step of making the exemplary composite airfoil.

Referring now to FIG. 5, the folded open preform 100 is shown in isometric view. In this configuration, the preform 100 includes upwardly extending flanges 120, 122 and downwardly extending flanges 124, 126. The areas 118 are shown which include through weave in the thickness dimension Z. Between the areas 118 is area 116 where the halves or sides 110, 112 are not connected in the through thickness dimension. Thus this area may define a cavity between sides 110, 112 from the between flanges 122, 126 to between opposite flanges 120, 124.

Figure 6:
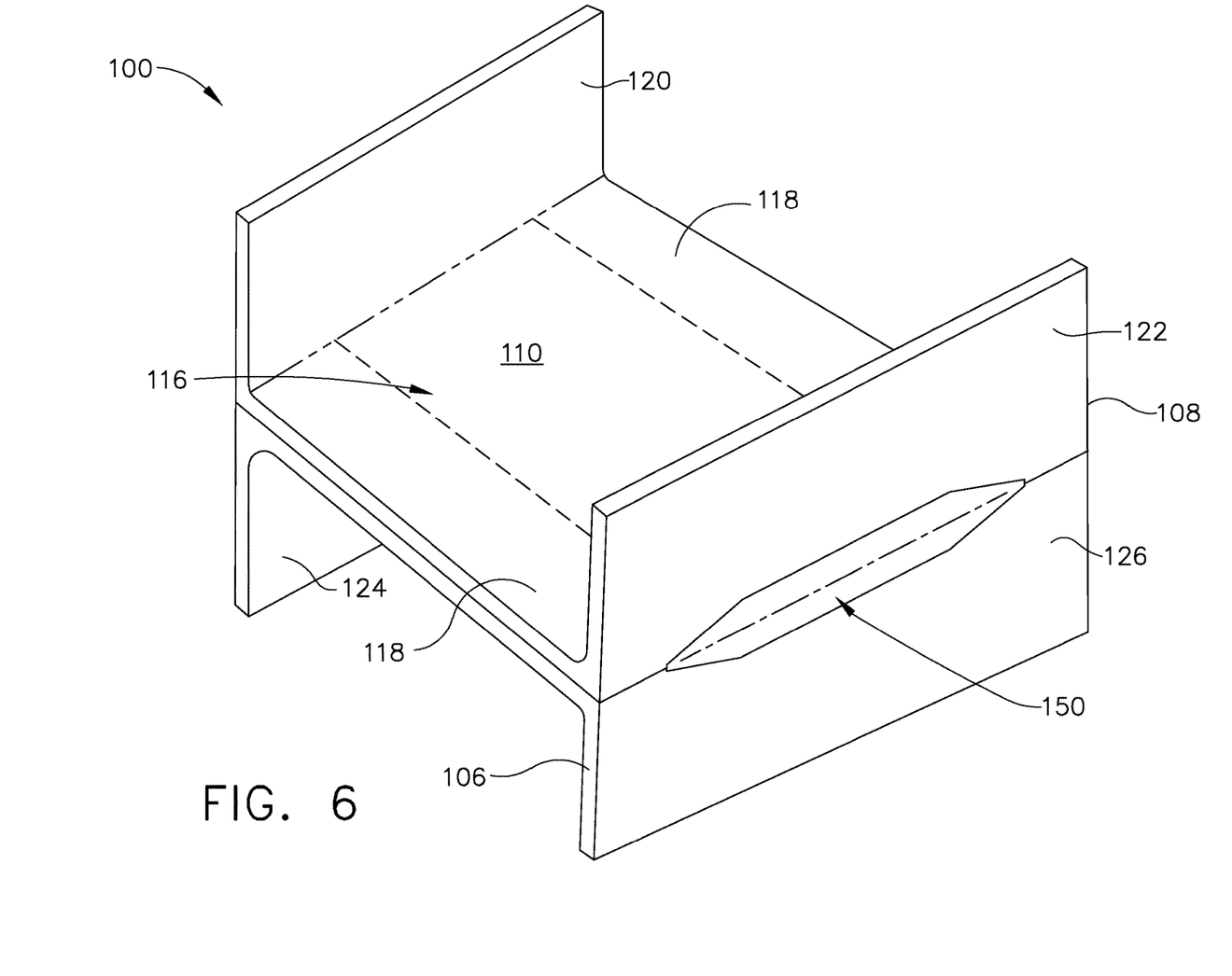
FIG. 6 is an isometric view of a further step of making the exemplary composite airfoil.

Referring now to FIG. 6, a preform is shown in an isometric view with core 150 inserted. The core 150 may be various shapes but when inserted into the preform 100 through area 116 and between areas 118, the core 150 causes the preform 100 to take the desired airfoil shape (shown as flat in this figure). The core 150 may be inserted by slowly forcing into the preform 100 or alternatively, applying a force to edges 106, 108 (FIG. 4) of the flanges 120, 122, 124, 126 causing the preform 100 to pucker or open, easing insertion of the core 150. This force may be applied along the edges until the core 150 is fully inserted.

The core 150 will be subsequently removed from the preform 100. The removal may occur by dissolving once the desired shape of the guide vane 32 is achieved. The core 150 may be formed of various materials suitable for dissolving in water or other fluids including plaster and graphite. Such material facilitates the removal by pulverizing the core 150. However, this is merely one means for removal and other manners of core removal 150 may be utilized.

Figure 11:
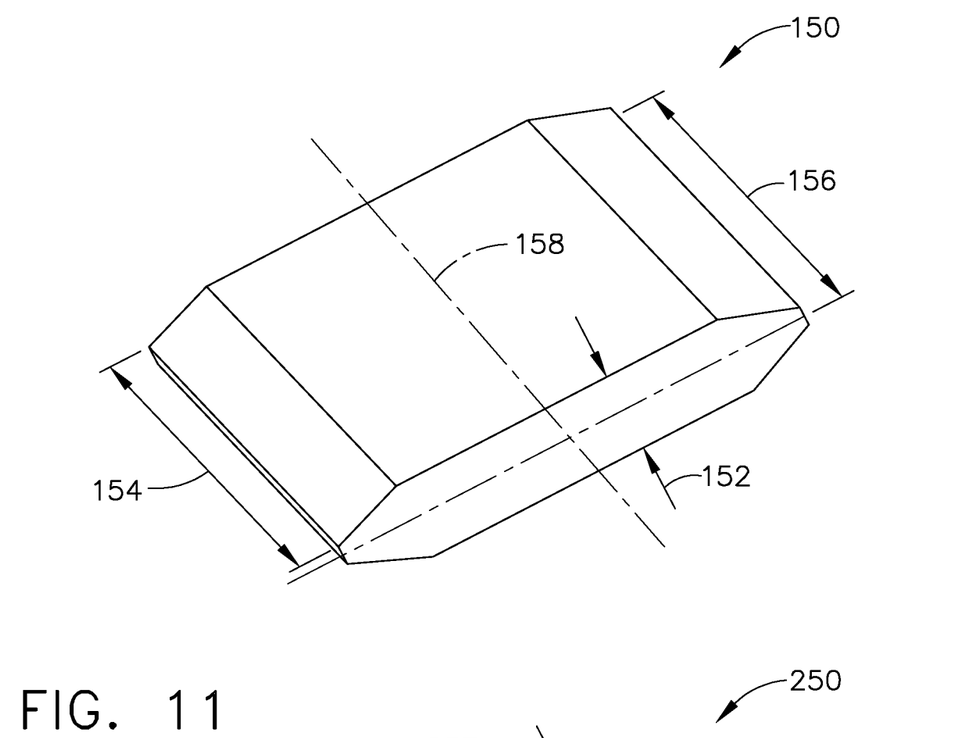
FIG. 11 is an isometric view of an exemplary core.
Figure 12:
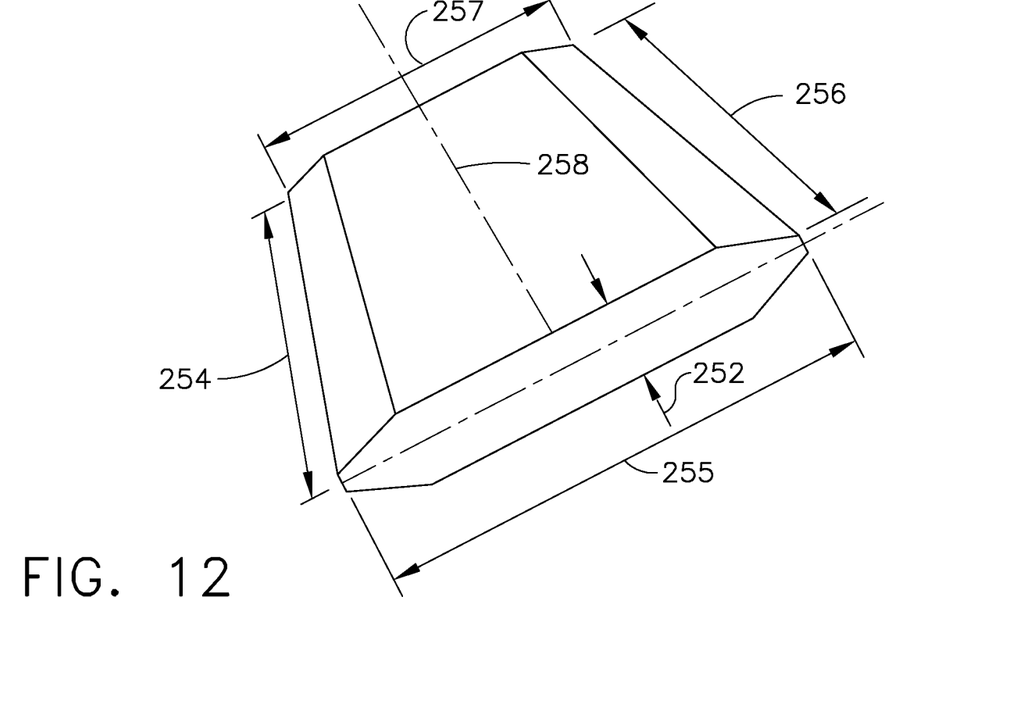
FIG. 12 is an isometric view of an alternate exemplary core.

Referring briefly to FIGS. 11 and 12, exemplary cores 150, 250 are depicted. The core 150 is an example of a basic symmetrical core having six sides. The number of sides may vary and the term symmetrical is used because the core 150 is of constant thickness in the dimension 152. Additionally, a width dimension 154 is shown at a leading edge and a width dimension 156 is shown at a trailing edge. The dimensions 154, 156 are constant according to this symmetrical embodiment.

The core 150 is shown as a generally linear structure, however, this is merely exemplary and shown for ease of description. The core 150 may alternatively be curved as is generally understood for an airfoil shape to one skilled in the art. For example, the surfaces may be curved similar to the air foil shape shown in FIG. 2 having pressure and suction sides.

A further alternative embodiment is shown. The core 250 is tapered structure between the radially outer end having dimension 255 and a radially inner end having dimension 257. Additionally, the thickness dimension 252 may vary or may be constant as with the previous embodiment. In the depicted embodiment, as with the previous embodiment, the core 250 may also have curved surfaces between leading and trailing edges, more similar to the embodiment shown in FIG. 2. Additionally, the cores 150, 250 may have twist or camber about axes 158, 258 between the radially ends 152, 252, 157 and 257.

Figure 7:
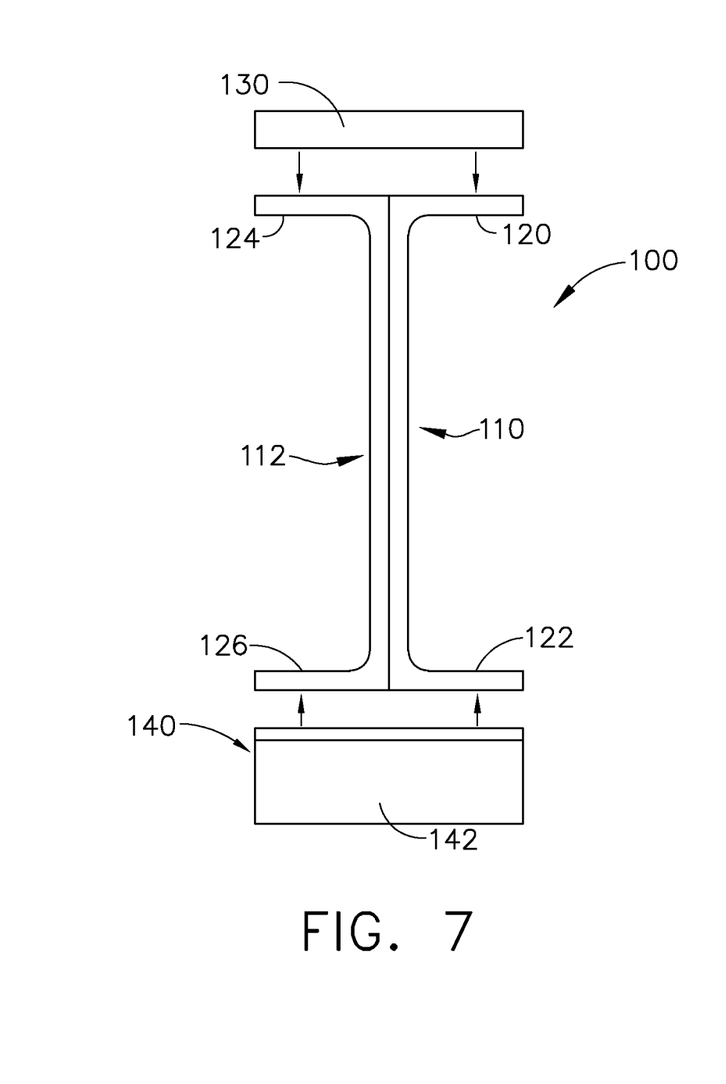
FIG. 7 is an elevation view of the preform during still further step in the process of making the exemplary airfoil.
Figure 8:
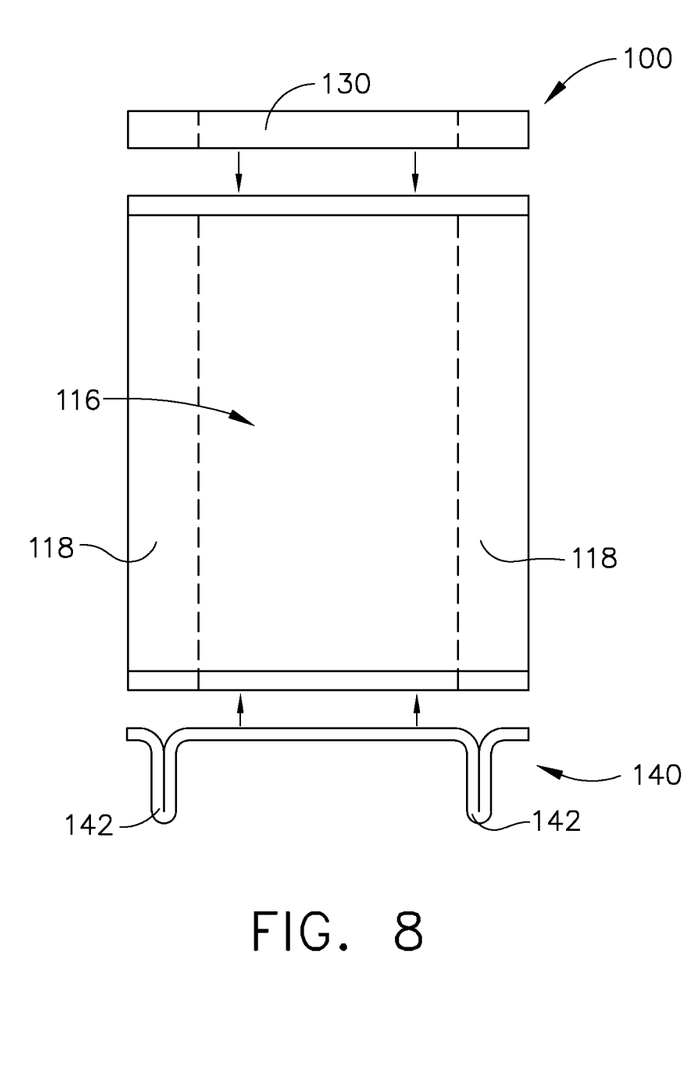
FIG. 8 is an elevation view rotated from that of FIG. 7.

Referring now to FIG. 7, a side elevation view of the preform 100 is shown with the flanges 120, 122, 124, 126 formed and core 150 deposed within the preform 100. Along the upper flanges 120, 124 is an outer diameter cover plate 130. The plate 130 may be formed of the same or similar composite material as the preform 100 and is stitched to the flanges 120, 124. Alternatively, the plate 130 may be formed of a metallic material. The plate 130 provides some strength and rigidity for the flanges 120, 124. The cover plates 130, 140 may be formed with bolt interfaces as shown in FIG. 3, formed solely of the composite or of a metal composite matrix.

At the inner diameter of the preform 100 is an inner diameter cover plate 140. The cover plate 140 at the inner diameter includes stiffening ribs 142 inhibiting bending of the flanges 122, 126. Like the O.D. cover plate 130, the I.D. cover plate 140 is stitched to the preform 100. The cover plate 140 may be formed of the same or similar composite material as the preform 100. As shown in the elevation view of FIG. 8, the stiffeners 142 inhibit bending about an axis through the stiffeners or parallel thereto.

Figure 9:
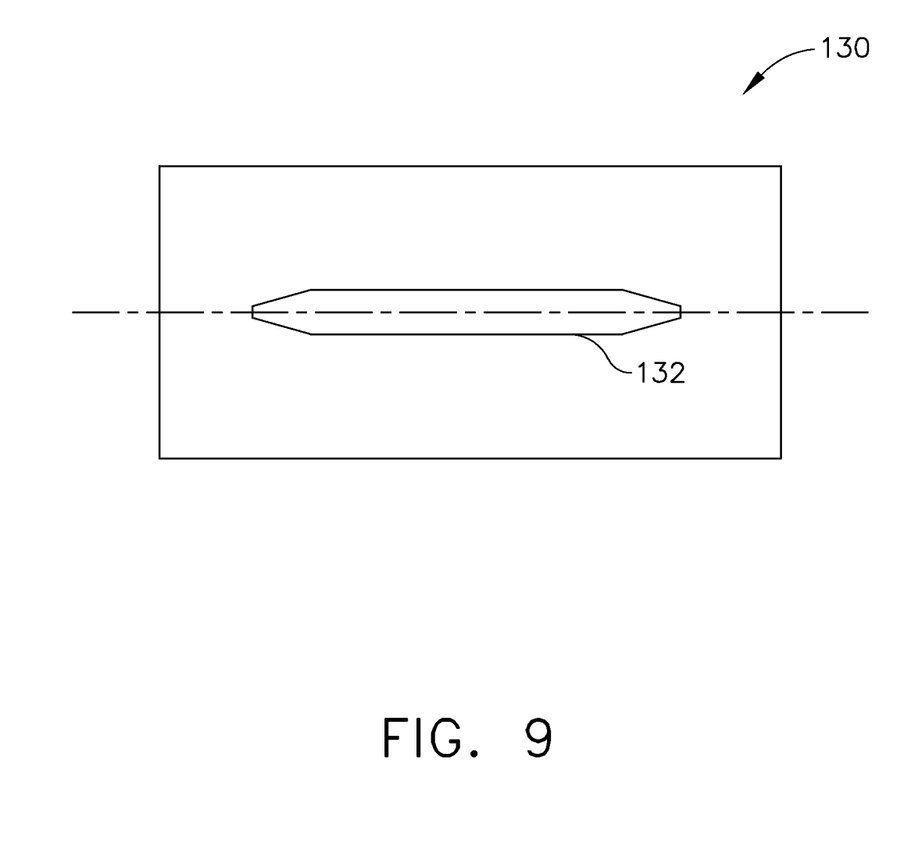
FIG. 9 is an top view of yet a further step in the process of making the exemplary airfoil.

Referring now to FIG. 9, a top view of the O.D. cover plate 130 is depicted. The cover plate 130 has an opening 132 which is aligned with the core 150. When the cover plates 130, 140 are stitched in position on the preform 100, the assembly is placed in a mold. The exemplary mold embodiment may comprise a resin transfer mold wherein resin is injected on the preform 100. Following molding the preform is cured into the guide vane 32 and the core 150 may be removed. The removal may comprise the use of heat to expand and pulverize the material of. The guide vane 32 may require some machining to form the final part.

Figure 10:
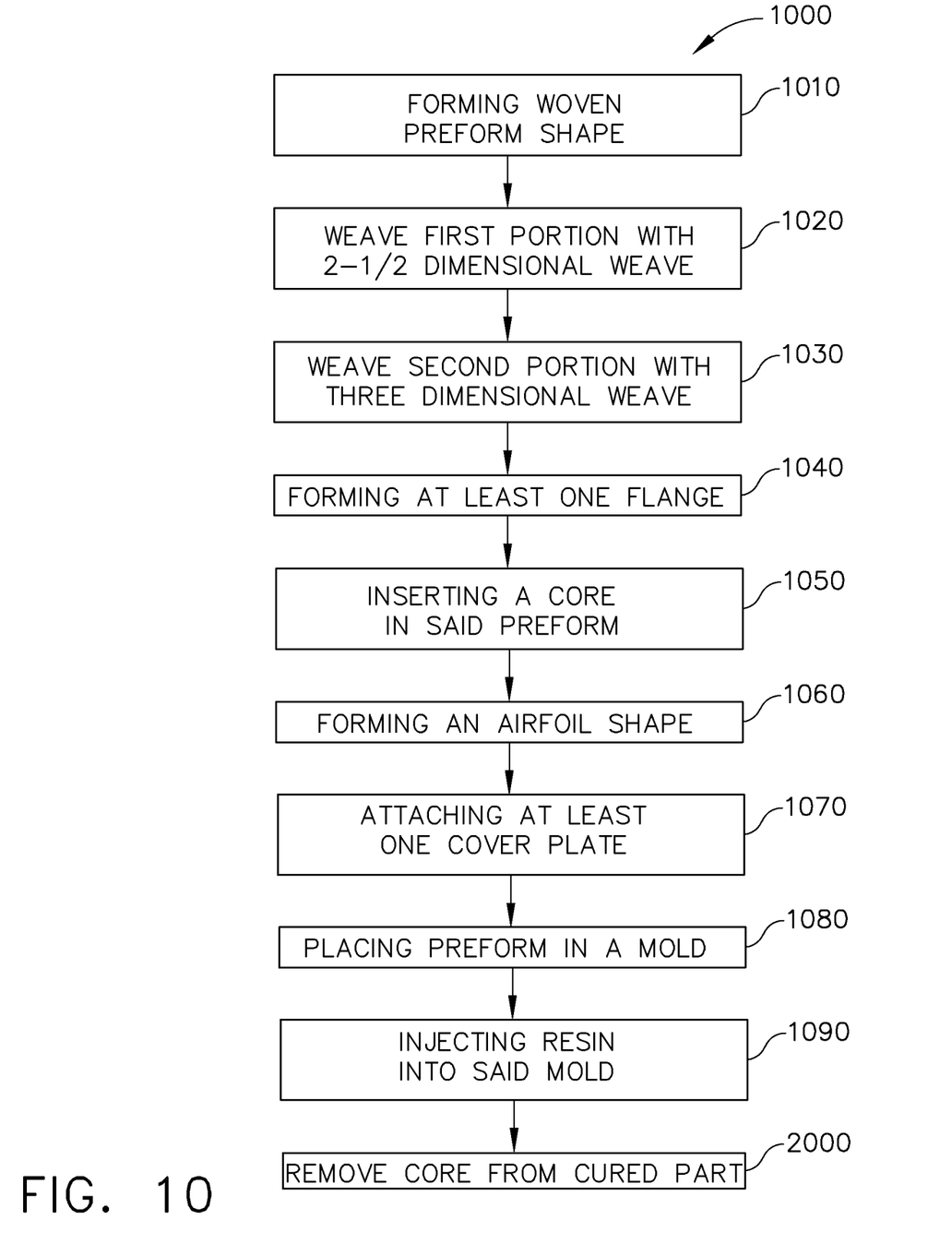
FIG. 10 is a flow chart depicting an exemplary method of forming a composite woven outlet guide vane.

Referring now to FIG. 10, a method 1000 of forming the outlet guide vane 32 is depicted. First, a woven preform shape is formed at step 1010. Next, the first portion of the preform 100 is formed with a two and one-half dimensional weave at step 1020 and the second portion of the preform 100 is formed with a three dimensional weave at step 1030. Next, at least one flange 1040 is formed in the preform. When the one or more flanges are formed, a core is inserted in the preform at step 1050. At step 1060, the preform and core are utilized to form an airfoil shape. Next, at step 1070, at least one cover plate is stitched or otherwise attached to the preform. At step 1080, the preform and cover plate is placed in a mold. Next, the mold is injected with a resin at step 1090 and cured. Afterward, the core 150 is removed, for example by dissolving, at step 2000.

As previously stated, the quick engine change embodiment provides for easy change engine components, which generally have fail parts and wear parts with higher maintenance requirements.

The foregoing description of structures and methods has been presented for purposes of illustration. It is not intended to be exhaustive or to limit the invention to the precise steps and/or forms disclosed, and obviously many modifications and variations are possible in light of the above teaching. Features described herein may be combined in any combination. Steps of a method described herein may be performed in any sequence that is physically possible. It is understood that while certain forms of an outlet guide vane with structural platforms have been illustrated and described, it is not limited thereto and instead will only be limited by the claims, appended hereto.

What is claimed is:

1. A method of forming a composite woven outlet guide vane, comprising:

forming a woven preform shape;

weaving a first portion of said preform shape with a two and one-half dimensional weave such that first portion defines an internal cavity;

weaving a second portion of said preform shape with a three dimensional weave;

integrally forming an inner flange at an inner end of said preform shape;

integrally forming an outer flange at an outer end of said preform shape;

inserting a removable core into said internal cavity of said woven preform in the area of said two and one-half dimensional weave;

forming a desired airfoil shape with said preform shape and said core, said airfoil shape including a leading edge, a trailing edge, a suction side and a pressure side;

attaching an inner cover plate at said inner flange;

attaching an outer cover plate at said outer flange;

placing said woven preform in a mold; and, injecting resin into said mold to form a molded outlet guide vane, wherein the molded outlet guide vane is hollow and defines the internal cavity in the first portion including the two and one-half dimensional weave between said outer flange and said inner flange each integrally formed with said molded outlet guide vane.

2. The method of forming a composite woven outlet guide vane of claim 1, said forming of at least one of said inner flange or the outer flange being a folding of at least one of said inner flange or outer flange.

3. The method of forming a composite woven outlet guide vane of claim 1, forming said two and one-half dimensional weave to extend from at least one of said inner flange or outer flange.

4. The method of forming a composite woven outlet guide vane of claim 1, further comprising forming a pocket extending through said woven preform.

5. The method of forming a composite woven outlet guide vane of claim 1, said removable core being dissolvable.

6. The method of forming a composite woven outlet guide vane of claim 1, said forming said inner flange and said outer flange each having flange halves.

7. The method of forming a composite woven outlet guide vane of claim 1, said forming said inner flange and said outer flange being folding.

8. The method of forming a composite woven outlet guide vane of claim 1, said weaving said second portion being through a thickness dimension.

9. The method of forming a composite woven outlet guide vane of claim 1, said weaving said first portion being excluding weaving through a thickness dimension.

10. The method of forming a composite woven outlet guide vane of claim 1, said attaching of at least one of the inner cover plate or the outer cover plate being stitching.

11. The method of forming a composite woven outlet guide vane of claim 1, said injecting being a resin transfer molding.

12. An outlet guide vane, comprising:
a composite outlet guide vane having an outer flange and an inner flange, wherein the composite outlet guide vane includes a first portion with a two and one-half dimensional weave and a second portion with a three dimensional weave;
a leading edge, a trailing edge, a suction side and a pressure side;
said outer flange and said inner flange formed integrally with said outlet guide vane;
an inner cover plate disposed on said inner flange and an outer cover plate disposed on said outer flange; and,
said composite outlet guide vane being hollow and defining an internal cavity in the first portion including the two and one-half dimensional weave between said outer flange and said inner flange.

13. The outlet guide vane of claim 12 further comprising a radial bolt interface at one of said inner cover plate or outer cover plate.

14. The outlet guide vane of claim 13 further comprising an axial bolt interface at the other of said inner cover plate or outer cover plate.

15. The outlet guide vane of claim 12, said suction side and said pressure side being curved.

16. The outlet guide vane of claim 12, said suction side and said pressure side being substantially linear.

17. The outlet guide vane of claim 12, wherein the outer cover plate defines an opening aligned with the internal cavity of the outlet guide vane.

18. The outlet guide vane of claim 12, further comprising:
a core housed within the internal cavity of the outlet guide vane, wherein the core is configured to be removed from the outlet guide vane.

* * * * *